United States Patent
Plaschke

(10) Patent No.: US 7,244,461 B2
(45) Date of Patent: Jul. 17, 2007

(54) METHOD OF PREPARING LIQUID SMOKE

(75) Inventor: Kim Plaschke, Næstved (DK)

(73) Assignee: Danfo A/S, Frederiksberg (DK)

( * ) Notice: Subject to any disclaimer, the term of this patent is extended or adjusted under 35 U.S.C. 154(b) by 182 days.

(21) Appl. No.: 10/311,309

(22) PCT Filed: Jun. 15, 2001

(86) PCT No.: PCT/DK01/00420

§ 371 (c)(1),
(2), (4) Date: Dec. 27, 2002

(87) PCT Pub. No.: WO02/00040

PCT Pub. Date: Jan. 3, 2002

(65) Prior Publication Data

US 2003/0134015 A1    Jul. 17, 2003

(30) Foreign Application Priority Data

Jun. 28, 2000    (DK) ............................... 2000 01010

(51) Int. Cl.
*A23L 1/22*    (2006.01)
*A23L 1/232*    (2006.01)

(52) U.S. Cl. ...................... 426/534; 426/424; 426/425; 426/429

(58) Field of Classification Search ................ 426/534, 426/422, 424, 425, 429
See application file for complete search history.

(56) References Cited

U.S. PATENT DOCUMENTS

| 3,106,473 A | 10/1963 | Hollenbeck ................ 99/229 |
| 3,480,446 A * | 11/1969 | Hollenbeck ................ 426/602 |
| 4,395,428 A | 7/1983 | Theiler ........................ 426/266 |
| 4,397,731 A * | 8/1983 | Warzel ........................ 208/401 |
| 4,431,033 A * | 2/1984 | Nicholson ................ 138/118.1 |
| 4,447,310 A | 5/1984 | Derbyshire et al. ....... 208/8 LE |
| 4,539,094 A | 9/1985 | Sunder et al. ............. 208/8 LE |
| 4,810,510 A | 3/1989 | Lever et al. ................. 426/233 |
| 4,883,676 A | 11/1989 | Sophianopoulos et al. .. 426/314 |
| 5,119,835 A * | 6/1992 | Heemann et al. ........... 131/297 |
| 5,169,968 A | 12/1992 | Rice ........................... 554/193 |
| 5,399,369 A * | 3/1995 | Singer ........................ 426/417 |
| 5,681,603 A | 10/1997 | Underwood ................. 426/271 |
| 5,840,362 A | 11/1998 | Underwood et al. ........ 426/650 |

FOREIGN PATENT DOCUMENTS

| DE | 35 40 544 | 5/1987 |
| EP | 0 423 393 | 4/1991 |

* cited by examiner

*Primary Examiner*—Arthur L. Corbin
(74) *Attorney, Agent, or Firm*—Jacobson Holman PLLC

(57) ABSTRACT

The invention relates to a method of preparing a smoke extract, which method comprises the steps of i) preparing a char from wood or cellulose preferably by pyrolysis, ii) extracting one or more fractions of the char with an extraction solvent in its supercritical state and/or an extraction solvent in its liquid state, said solvent in its supercritical state being selected from the group consisting of $CO_2$, propane, methane, ethylene, ammonia, methanol, water and mixtures of one or more of these solvents, said solvent in its liquid state being selected from the group consisting of $CO_2$, propane and mixtures of these components, iii) collecting at least some of the extracted char to thereby obtain a smoke extract.

39 Claims, No Drawings

METHOD OF PREPARING LIQUID SMOKE

This is a nationalization of PCT/DK01/00420, filed Jun. 15, 2001 and published in English.

The present invention relates to a method of preparing a smoke extract, preferably in the form of liquid smoke for use as flavouring and/or colouring agent in food. The invention also relates to a smoke extract, use of the smoke extract and the food product prepared using this smoke extract. Furthermore, the invention relates to a method of preparing a smoked fish product.

The art of smoking human food such as fish, sausages, ham, bacon and other smoked meat products has been developed through many years. The original object of the smoking process was at least partly to conserve the food by inhibiting microbiological activities therein. A secondary object of the process was to give the food a certain smoked flavour.

The original smoking process was performed by placing the object to be smoked in an oven or chimney through which the smoke from burning or glowing wood or wooden coal was led. For some purposes, it is also known to mix the smoke with steam. The classical smoking process takes several hours depending on the type and/or amount of object to be smoked, and the precise smoking method. The methods are unfortunately only suitable for batch-wise production and it is, furthermore, difficult to obtain a uniform quality of the smoke flavour as the raw material for the smoke may vary significantly.

There have accordingly been attempts to chemically produce and/or extract the smoke flavour from various raw materials. One method known in the art as the production of "liquid smoke" essentially comprises the steps of burning saw dust or the like and extracting the water soluble components of the smoke obtained by a counter current stream of water or steam which is then condensed. Such method is i.e. disclosed in U.S. Pat. No. 3,106,473.

One of the drawbacks mentioned in connection to this liquid smoke method is, however, the production of large amounts of water insoluble by-products in terms of tar.

When burning wood or decomposing wood by other pyrolysis methods known in the art, the amount of liquids obtained is generally about 30–40% by weight of the wood. The remaining components are decomposed into gasses and char. Of the obtained liquids only about 40–50% by weight are soluble in water. This means that the major part of the liquids, namely the tar cannot be used in the above-mentioned method.

The liquids obtained from pyrolysis of woods generally contain large amounts of carcinogenic components in the form of pyrens and benz antrachenes. In particular, the component benzo(a)pyrene is a highly carcinogenic component. These carcinogenic components are mainly concentrated in the tar and the tar has therefore generally been considered as unusable in human food.

U.S. Pat. No. 4,883,676 discloses a method of making liquid smoke producing very little tar, wherein a very thin layer of saw dust is combusted to release dry smoke which is directly condensed or alternatively dissolved in water. This method, however, is not very useful for large-scale production as it requires strict control of many different parameters and that only a small amount of saw dust can be burned of in each step.

An attempt to treat the tar to obtain a useful colouring and flavouring agent is described in U.S. Pat. No. 5,681,603. The liquid decomposition product is obtained as it is generally known by pyrolysis of wood, and the water-soluble components of the liquid decomposition products are removed. The water insoluble tar is mixed with and dissolved in an aqueous solution of alkali to obtain a mixture having a pH value between 10 and 13. Thereafter, 80–90% by weight of the polynuclear aromatic compounds are removed from the tar-solution by contacting the solution with a non-ionic, aromatic hydrocarbon-based resin. The final solution may contain about 10 ppm or less of benzo(a)pyrene. The method may be suitable to remove some carcinogenic components from the tar. However, only some components can be removed and further, it is not easy to reproduce liquid smoke with similar quality and composition. Even though wood is pyrolysed using same method, the composition of the tar may vary a lot and consequently, the composition of the resulting liquid smoke obtained from the tar may vary a lot. Furthermore, the use of aromatic hydrocarbon-based resin may be very expensive, or if using regenerated resin, unwanted amounts of regeneration liquids e.g. methanol, isopropyl or acetone is introduced into the liquid-smoke.

Alternative methods of extracting smoke flavour comprise attempts to dissolve wooden tar in ether and extracting and/or distillation the solution. However, it is in general not desirable to operate with large amounts of volatile and explosive substances such as ether, and the method is thus far from ideal from a health and environmental point of view. Furthermore, the obtained smoke flavour fractions often contain trace amounts of ether, which make them unsuited for human nutrition.

Although many of the potentially harmful substances are known, the above-mentioned chemical approaches unfortunately fail to provide a completely safe product.

Therefore, there remains a need for a new and efficient method for obtaining liquid smoke, which does not exhibit the above-mentioned drawbacks.

The objective of the present invention is therefore to provide a smoke extract containing less than 10 ppm of benzo(a)pyrene, less than 20 ppm of benzo(a)anthracene and by use of which food products with a highly acceptable taste of smoke can be prepared.

Furthermore, the objective of the invention is to provide a smoke extract, which can be prepared with uniform qualities, in an economically feasible way.

Also it is an objective to provide a method of preparing a smoked fish product, which can be prepared with uniform qualities, in an economically feasible way.

These and other objectives as it will appear from the following description are achieved by the invention as defined in the claims.

In accordance with the claims, the smoke extract is prepared using a method comprising the steps of i) preparing a char from wood or cellulose preferably by pyrolysis, ii) extracting one or more fractions of the char with an extraction solvent in its supercritical state and/or an extraction solvent in its liquid state, said solvent in its supercritical state being selected from the group consisting of $CO_2$, propane, methane, ethylene, ammonia, methanol, water and mixtures of one or more of these solvents, said solvent in its liquid state being selected from the group consisting of $CO_2$, propane, and mixtures of these components.

iii) collecting at least some of the extracted char to thereby obtain a smoke extract.

The char may in principle be prepared by use of any known methods. As it will be apparent, the method of preparing smoke extract according to the invention particular differs from known methods of producing smoke extract in that all of the char produced during pyrolysis of wood and similar materials are usable in the method. Consequently, the initial char may contain both water-soluble and water insoluble char as well as ash and other contaminants.

The char phase may for example be prepared by decomposing wood or cellulose by pyrolysis; guiding the pyrolysis gas to a condensing chamber and condensing the gas to obtain a char phase.

The char may preferably be prepared from wood obtained from the trees maple tree (*Acer negundo* L.), White birch (*Betula pendula* Roth-with ssp. *B. alba* L. and *B. verrucosa* Ehrh), European birch (*Betula pubescens* Ehrh), hornbeam (*Carpinus betulus* L), hickory (*Carya ovata* (Mill.) Koch (*C. alba* (L.). Nutt.), chestnut tree (*Castanea sativa* Mill.), eucalyptus (*Eucalyptus* sp.), beech (*Fagus grandifoliz* Erhr. and *Fagus silvatica* L.), common ash (*Fraxinus excelsior* L), walnut tree (*Junglans regia* L.), apple (*marlus pumilia* Moll.), mesquite wood (*Prosopis juliflora* DC.), cherry tree (*Prunus avium* L.), white oak (*Quercus alba* L.), common red oak (*Quercus robur* L.), alder buckthorn (*Rhamnus frangula* L.), black locust (*Robinapseudoacacia*), sweet elm (*Ulmus fulva* Michx) and elm (*Ulmus rubra* Muhelenb.).

The extraction solvent in the form of $CO_2$, propane, methane, ethylene, ammoniac, methanol, water and mixtures of one or more of these solvents in its supercritical state is defined as the solvent under conditions wherein the solvent acts as a supercritical fluid or partly as a supercritical fluid. When a solvent partly acts as a supercritical fluid, it is also called its subcritical state. The supercritical state thus preferably also includes the solvent in its subcritical state where the pressure may be down to about 25 bars below the critical point of the solvent and the temperature may be down to about 30° C. below the critical point of the solvent. The critical point for the components $CO_2$, propane, methane, ethylene, ammoniac, methanol and water is as follows:

TABLE 1

Critical points:

|  | Critical temperature (° C.) | Critical pressure (atmospheres) |
|---|---|---|
| propane | 96.7 | 44.2 |
| methane | −82.6 | 46.0 |
| ethylene | 9.3 | 50.3 |
| ammoniac | 132.5 | 113.0 |
| methanol | 239.5 | 80.9 |
| water | 374.2 | 220.0 |
| $CO_2$ | 31.1 | 73.8 |

The solvent in its liquid state selected from the group consisting of $CO_2$, propane, and mixtures of these components, should preferably have a temperature of 30° to 60° C. below its critical temperature and a pressure between 25 bars above and 25 bars below its critical pressure.

Prior to the extraction step ii) the char may preferably be mixed with a carrier, which is substantially non-soluble in the extraction solvent in its supercritical state to obtain an immobilised char phase. The use of a carrier may reduce the contacting time in the extraction step ii).

In principle, any type of carrier may be used. Preferred carriers are diatomite and celite. The ration of char to carrier may e.g. be between 1:0.1 and 1:10, preferably between 1:0.5 and 1:2.

The char phase may also be diluted or suspended prior to the extracting step ii), by adding a liquid solvent/suspending agent and optionally inorganic acid/basic components prior to the extraction step. In one aspect the liquid solvent/suspending agent may be added in order to protect the equipment from the adherence of char. In general the char normally contains a substantial amount of water, however, if the water content or content of other liquid solvent/suspending agent gets too low, the char may stick to the equipment. In order to avoid this the char is preferably diluted or suspended to an average char concentration of less than 95% by weight, preferably less than 80% by weight. The amount of liquid solvent/suspending agent added to the char may preferably be up to about 500% by weight of the char, more preferably up to about 100% by weight of the char. Preferably the char concentration in the char prior to the extraction step should be between 10 and 95% by weight.

The liquid solvent/suspending agent may also have a second function, namely, when the extraction is carried out in a counter current process, the addition of liquid solvent/suspending agent may be useful in adjusting the transport time for the char.

In general, the liquid solvent/suspending agent should be non-toxic to humans since some of the liquid solvent/suspending agents may be extracted by the extraction solvent, and thus will be present in the final product. The liquid solvent/suspending agent may preferably be selected from the group consisting of vegetable oils, animal oils, ethanol, water or mixtures thereof.

In a second aspect the liquid solvent/suspending agent is an enhancer for the extraction of fractions from the char. An enhancer in this application is defined as a component, which improves the ability of supercritical solvents to extract high molecular components from the char. The enhancers selected from the group consisting of methanol, ethanol, water or mixtures thereof, may preferably be added to the char prior to the extraction step or it may be injected separately into the reactor wherein the extraction takes place. In order to obtain the enhancing effect of water, methanol, ethanol at least 0.1% v/v of the char should be added, preferably at least 1% v/v of the char should be added. In general, there is no upper limit as the effect will not increase further when more than about 5% v/v of the char of each enhancer component is added.

The method according to the invention may be carried out in a batch wise mode, wherein the extraction step comprises batch wise extraction of the char or a continuous mode, wherein the extraction step comprises continuous extraction of the char.

The batch wise mode may further be carried out with continuous solvent supply or batch wise solvent supply or a combination thereof.

The method of preparing a smoke extract according to the invention, which is carried out with batch wise solvent supply may preferably include the steps of
a) placing a portion of the char in a reaction container,
b) bringing the extraction solvent into intimate contact with the char for a sufficient time to extract a measurable amount of the char, said extraction solvent preferably being in its supercritical state,
c) removing the solvent from the not extracted part of the char by bringing the solvent into its gas phase, and collecting the extracted char from the solvent,
d) optionally, repeating steps b) and c) one or more times and optionally, pooling the collected extracted char.

In step a) the char phase optionally mixed with the carrier and/or liquid as described above is placed in a reaction container. Such reaction containers for supercritical extraction procedures are generally known in the art. In a preferred embodiment, the reaction container is an extraction pipe comprising a restrictor or a tight filter through which the solvent may be pressed.

The amount of char treated in a reactor may vary and is mainly dependent on the equipment used. Basically, the amount of char should not increase ⅓ of the volume of the container because the contact between the solvent and the char may be too poor. Prior to the step of contacting the char phase with the solvent in its supercritical state, the char phase may preferably be preheated to a temperature close to the extraction temperature e.g. between 40° C. and 95° C., in order not to reduce the temperature of the extraction solvent.

In step b) a solvent in its supercritical state is brought into contact with the char phase. During the contacting step b) the temperature of the char phase is preferably controlled e.g. by use of any suitable heating means. The reaction container may e.g. be placed in an oven or be equipped with a heat regulating element e.g. using induction heating for regulating the temperature at the contacting step.

The optimal contacting time of the contacting step depends on the amount of char and the amount of solvent in the reactor, and as mentioned, the optimal contacting time may be reduced by using carrier or liquid solvent/suspending agent. Furthermore, the optimal contacting time largely depends on the shape of the container and the equipment used. Furthermore, a too low temperature, such as a temperature below 20° C., may increase the optimal contacting time.

Generally, it is preferred that the char phase is contacted with the solvent in its supercritical state for at least 5 minutes, preferably at least 15, and more preferably between 20 and 60 minutes.

In step c) the extracted smoke component is removed from the reaction container together with the solvent in its supercritical state, and the solvent is brought into its gas phase and the extracted fraction is collected.

Generally, this may be done by removing the solvent in its supercritical state from the non-dissolved part of the char phase by guiding the solvent out of the reactor container and into a reduction chamber wherein the pressure is reduced sufficiently to bringing the solvent into its gas phase.

The method according to the invention may be carried out in a batch wise mode, wherein the extraction step comprises batch wise extraction of the char or a continuous mode, wherein the extraction step comprises continuous extraction of the char.

The batch wise mode may further be carried out with continuous solvent supply or batch wise solvent supply or a combination thereof.

The method of preparing a smoke extract according to the invention, which is carried out with continuous solvent supply may preferably include the steps of a) placing a portion of the char in a reaction container e.g. a reaction container as described above but equipped with two restrictors. The two restrictors may be constituted by two openings covered with a filter, having a filter mesh sufficiently small so as not to allow the non-extracted char to escape from the reactor and sufficiently large so as to allow the extraction solvent to pass the filters under the extraction conditions, b) bringing a flow of the extraction solvent through the reactor, so that the extraction solvent during its passage through the reactor comes into intimate contact with the char, c) collecting the extraction solvent from the reactor, bringing the extraction solvent into its gas phase, and collecting the extracted char from the solvent, d) keeping the flow of extraction solvent through the reactor for a sufficient time to extract a measurable amount of the char.

The extraction solvent may preferably be in its supercritical state. The flow of the extraction solvent through the reactor may preferably be at least 0.5 kg extraction solvent per 1 volume of the reactor per hour, more preferably between 1 and 10 kg extraction solvent per 1 volume of the reactor per hour.

The flow may be adjusted to obtain an optimal contacting time, which as mentioned above depends on many factors.

The flow of solvent through the reactor may be kept until an optimal amount of char is extracted.

The method according to the invention carried out in a continuous mode, wherein the extraction step comprises continuous extraction of the char, may preferably be carried out in a column reactor. The column reactor preferably comprises at least two extraction solvent openings preferably covered with a filter, having a filter mesh sufficiently small so as not to allow the non-extracted char to escape from the reactor and sufficiently large so as to allow the extraction solvent to pass the filters under the extraction conditions, and an entrance and an outlet for char.

The method of preparing a smoke extract according to the invention, which is carried out with batch wise solvent supply may preferably include the steps of a) continuous introduction of char and extraction solvent into the column reactor to perform a counter current extraction, allowing the extraction solvent with extracted char to flow out of the column reactor to obtain/maintain a predetermined pressure, removing the unextracted char from the column reactor continuously or step wise, b) bringing the extraction solvent from the column reactor into its gas phase, and collecting the extracted char from the solvent.

The extraction solvent at the extraction step is preferably in its supercritical state.

The flow of solvent and char may be adjusted to obtain an optimal contacting time. To obtain an effective use of the equipment the flow of solvent may preferably be at least 0.5 kg extraction solvent per 1 volume of the column per hour, more preferably between 1 and 25 kg extraction solvent per 1 volume of the reactor per hour.

The column reactor may preferably be a packed column reactor filled with any type of fillers e.g. Interpack®, 10 mm, VFF, Ransbach-Baumbach, Germany.

In the method according to the invention it is in general preferred to use an extraction solvent, which comprises at least 90%, preferably at least 95% by weight of $CO_2$.

The solvent in its supercritical state and the char may preferably have a temperature between 20° and 100° C., more preferably between 40° and 60° C. during the extraction. As mentioned above the char may be preheated, and the equipment may comprise heat-regulating means and the temperature of the extraction solvent may be regulated during the extraction step.

The pressure in the reaction container during the contacting step is very important, as it has been found that the composition of the extracted smoke extract largely depends on the pressure.

It is preferred that the char phase is contacted with the solvent in its supercritical state at a pressure between 75 and 500 bars, more preferably between 100 and 250 bars, and even more preferably about 150 bars.

The optimal contacting time is not the time necessary to extract as much as possible from the char, but the time necessary to extract at least 1% by weight of the char phase and not more than 60% by weight of the char. If too much of the char phase is extracted, the concentration of carcinogenic component as well as bitter tasting components in the smoke extract increases to an undesired level. It is preferred that the total amount of smoke extract extracted from the char phase in one or more steps does not exceed 40% by weight, and preferably does not exceed 20% by weight. Consequently, the temperature, the pressure and the contact time are chosen so that at least 1% by weight, preferably between 5 and 60% by weight and more preferably between 5 and 20% by weight of the char is dissolved in the solvent in its supercritical state.

The extracted char may preferably be collected from the solvent by removing the solvent from the non-dissolved part of the char, and reducing the pressure in one or more steps e.g. in two, three or four steps, wherein at least some of the extracted char is condensed in each step of pressure reduction. The condensed char in each step of pressure reduction may be collected separately to obtain one or more fractions of extracted char. These fractions can thus be used in different combinations to obtain different smoke taste and smoke flavouring properties.

In a preferred embodiment the extraction solvent comprises at least 90%, preferably at least 95% by weight of $CO_2$, and the pressure is reduced in three steps, wherein the pressure in the first step of reduction is reduced to 95–100 bars, the pressure in the second step of reduction is reduced to 75–85 bars, and the pressure in the third step of reduction is reduced to about 55 bars or lower.

The directly obtained char extract may be used in food products as it is, but preferably, the smoke extract is mixed with salt and other spices e.g. for use in dressings and as additive in minced meat products.

In a preferred embodiment, the extracted char is mixed with a liquid to obtain a liquid smoke extract. The liquid may preferably be an oil or a mixture of oils, preferably selected from the group consisting of vegetable oils and animal oils The amount of liquid added to the extracted char depends on the desired use of the final smoke extract. Generally, it is preferred that the char is mixed with up to about 100 part by weight of liquid, preferably between 25 and 50 part by weight of liquid per part by weight of extracted char.

In a preferred embodiment the extracted char is mixed with oil to a concentration of 2 to 10% by weight of char in oil.

Other spices, such as herbs and dill may also be added.

As mentioned above, the invention also relates to the smoke extract obtainable by the method according to the invention. By use of this smoke extract a food product having a highly acceptable taste without bitter after taste may be produced. Furthermore, the content of carcinogenic components in the smoke extract and consequently in the produced food product is highly reduced compared to naturally smoked food products. Generally, the smoke extract produced according to the method of the invention has a concentration of benzo(a)pyrene below 10 ppm and a concentration of benzo(a)anthracene below 20 ppm.

The smoke extract according to the invention should preferably comprise at least 1 mg/ml of each of the components guaiacol, eugenol, isoeugenol and 2,6-dimethoxyphenol. Furthermore, it is preferred that the smoke extract comprises at least 1 mg/ml of each of the components furfural, phenol, 5-methyl-furfural, 2-hydroxy-3-methyl-2-cyclopenten-1-on, o-cresol, p-cresol, 2,4-dimethylphenol, 2-methoxy-4-methylphenol, 4-ethylguaiacol, 3-methoxy-catecol; methyl-syringol, ethyl-syringol, 4-hydroxy-3-methoxyphenylacetone, propyl-syringol, 4-allyl-2,6-dimethoxyphenol, 1-propenyl-syringol, 3,5-dimethoxy-4-hydroxybenzaldehyde, 3,5-dimethoxy-4-hydroxyacetophenone and acetonyl-syringol.

The smoke extract according to the invention may be used in any food products, e.g. any type of meat, salads, chips drops, sups, vegetables, drinks and cheeses. The smoke extract may be mixed with the food product or it may be applied onto a surface area of the food product, preferably in the form of a liquid smoke extract. The smoke extract may also be used as scent enhancer both in food and in non-food products.

Preferably, the food product is either ham or fish.

The invention also relates to a particularly preferred method of preparing a smocked fish product. This method comprises the steps of 1) cleaning the fish meat,
2) applying a smoke extract according to anyone of the claims 19–21 onto the surface of the fish meat,
3) packing the fish meat in a polymer film,
4) treating the packed fish meat with microwaves.

It is preferred that the fish meat is obtained from salmon, eel, herring, mackerel or trout, but the skilled person will know that any type of fish meat may be used.

In order to increase the penetration depth of the smoke extract, particularly if the piece of fish meat is very thick, the surface of the fish meat may preferably be perforated prior to the application of the smoke extract.

The perforation may preferably be made by use of a roller instrument, having a cylindrical shape with protruding needles or knives from its outer cylindrical surface. The length of the needles or knives should be up to the half thickness of the largest thickness of the fish meat, preferably the length of the needles or knives should not exceed 2 cm. The roller instrument is brought into contact with a surface of the fish meat and rolled over the total of a surface side of the fish meat.

The smoke extract is applied onto the surface of the fish meat. The amount of smoke extract applied onto the fish meat may vary depending on the concentration of smoke components in the smoke extract and the smoke flavour desired in the product. Usually, the preferred amount of extracted char added to fish as smoke extract is between 0.01 and 5 mg extracted char/kg fish, more preferably between 0.1 and 1 mg extracted char/kg fish, and even more preferred between 0.15 and 0.3 mg extracted char/kg fish.

The fish meat may preferably be vacuum packed, preferably in a polyethylene film, but other polymeric films may also be used.

Finally, the packed fish meat is treated with microwaves. The treatment should generally be very light in order not to make areas of the fish meat boil, on the other hand the treatment should be sufficient to soften the collagen fibres to obtain the desired texture of the fish meat. The treatment thus may include a treatment at relatively high microwave effect for relatively short time, or more preferred a relatively low microwave effect for a relatively long time. By use of the low microwave effect long time treatment the process is much easier to control. In this application high microwave effect means a microwave effect above 1000 watt e.g. 1000 to 5000 watt, and low microwave effect means a microwave effect below 1000 watt e.g. 10 to 1000 watt, preferably 50 to 500 watt. Long treatment time means more than 50 seconds/kg fish meat, e.g. 50 to 500 seconds/kg fish meat, and short time means below 50 seconds/kg fish meat.

Preferably the fish meat is treated in a microwave oven having an effect of 90–100 watt for a period between 60 and 500 seconds per kg meat.

The method of producing smoked fish according to the invention results in smoked fish with a very high organoleptic quality. Generally fish meat prepared by the method according to the invention is much more juicy than traditionally smoked fish. The treatment with microwaves provides the fish meat with a texture similar to the texture of a naturally smoked fish. Also, the product is very cheap to produce and due to the fast procedure the risk of contaminating the fish product with undesired bacteria is highly reduced compared to known methods of producing smoked fish.

Furthermore, the method of producing smoked fish according to the invention requires only little space.

The invention will be further illustrated in the examples.

EXAMPLE 1

Char was obtained from decomposed ash wood purchased from P. Brøste A/S.

A number of samples were prepared by immobilizing 0.75 g of the char onto 0.625 g diatomite earth (SFE Wetsupport® from ISCO). The extraction of char phase from the char was carried out in a Suprex Autoprep 44®. Some of the samples were further mixed with ethanol as a modifier. Each sample was placed in a 5 ml extraction pipe. The samples were treated with $CO_2$ in a flow of about 1.5 ml/min for about 30 minutes. For each test two samples were extracted and the extracted char was collected. 8 tests were carried out using different pressure and temperature and further the samples used in four of the tests contained 2.5% by weight of modifier.

The results are shown in table 2.

TABLE 2

| Extraction no. | Pressure bars | Temperature ° C. | Modifier % ethanol by weight of char | Extracted char w/w % of char raw material |
|---|---|---|---|---|
| 1 | 150 | 40 | 0 | 23 |
| 2 | 250 | 40 | 0 | 14 |
| 3 | 150 | 60 | 0 | 16 |
| 4 | 250 | 60 | 0 | 15 |
| 5 | 150 | 40 | 2.5 | 12 |
| 6 | 250 | 40 | 2.5 | 14 |
| 7 | 150 | 60 | 2.5 | 12 |
| 8 | 250 | 60 | 2.5 | 14 |

It was observed that the odours of the extracted fractions were very different from each other, and particular the fractions obtained using different pressure were very different form each other, indicating that the pressure during the extraction step largely influences the composition of the obtained fractions.

EXAMPLE 2

A number of samples were prepared as in example 1 using 1.5 g char immobilized onto 1.25 g diatomite earth. No modifier was added to the samples, but NaOH was added to half of the samples, thereby adjusting the pH value of these samples to about 13.

TABLE 3a

| Raw materials | Sample numbers | Pressure bars | Temp. ° C. | Extracted char w/w % of char raw material % | Standard deviation |
|---|---|---|---|---|---|
| Raw char | 2 | 150 | 35 | 22.3 | 0.14 |
| | 2 | 150 | 40 | 23.1 | 1.13 |
| | 1 | 150 | 60 | 16.2 | — |
| | 1 | 250 | 35 | 12.8 | — |
| | 2 | 250 | 40 | 13.4 | 0.34 |
| | 1 | 250 | 60 | 20.8 | — |
| | 1 | 470 | 35 | 4.5 | — |
| | 2 | 470 | 40 | 5.1 | 0.61 |
| | 1 | 470 | 60 | 13.2 | — |
| | 150 + 250 | | 35 | 35.1 | |
| | | | 40 | 36.5 | |
| | | | 60 | 37.0 | |
| | Total | | 35 | 39.6 | |
| | | | 40 | 41.6 | |
| | | | 60 | 50.2 | |

For each test, 2 samples were used and the result is the means value of these two samples. In some of the tests the extraction pipe leaked and in these tests the result is based on one single sample. In the extraction $CO_2$ with a flow of about 1.5 ml/min was used. In a first step the samples were extracted at a pressure about 150 bars for about 30 minutes, followed by a second step where the samples were extracted at a pressure about 250 bars for about 30 minutes, and a third step where the samples were extracted at a pressure about 470 bars for about 30 minutes. The temperature was for each sample kept about 35, 40 or 60° C. during all three extraction steps. The fractions from each extraction step for the respective samples were collected separately.

The results can be found in tables 3a and 3b.

TABLE 3b

| Raw materials | Sample numbers | Pressure bars | Temp. ° C. | Extracted char w/w % of total raw material. % | Standard deviation | Extracted char w/w % of char raw material. % |
|---|---|---|---|---|---|---|
| Raw char + NaOH | 2 | 150 | 35 | 1.3 | 0.12 | 6.3 |
| | 2 | 150 | 40 | 1.2 | 0.06 | 6.2 |
| | 2 | 150 | 60 | 1.3 | 0.15 | 6.4 |
| | 2 | 250 | 35 | 0.6 | 0.02 | 2.8 |
| | 2 | 250 | 40 | 1.3 | 0.01 | 6.4 |
| | 2 | 250 | 60 | 0.8 | 0.02 | 4.2 |
| | 2 | 470 | 35 | 0.4 | 0.01 | 2.0 |
| | 2 | 470 | 40 | 0.5 | 0.01 | 2.5 |
| | 2 | 470 | 60 | 0.6 | 0.02 | 3.1 |
| | 150 + 250 | | 35 | 1.8 | | 9.1 |
| | | | 40 | 2.5 | | 12.6 |
| | | | 60 | 2.1 | | 10.6 |
| | Total | | 35 | 2.2 | | 11.1 |
| | | | 40 | 3.0 | | 15.1 |
| | | | 60 | 2.7 | | 13.7 |

EXAMPLE 3

Char was obtained from decomposed ash wood purchased from P. Brøste A/S.

About 2000 g char was immobilized onto about 1000 g celite, and placed in a 5 l extraction autoclave. The temperature was adjusted to about 40° C. and the $CO_2$ was introduced until a pressure of about 150 bars was reached.

A flow of about 16 kg/h of $CO_2$ was established through the autoclave, and this flow was maintained for about 3 hours. The $CO_2$ was passed from the autoclave into a 3-step separator. In the first separator step the pressure was reduced to about 100 bars, the temperature was maintained at 40° C., and the condensed char fraction was collected as fraction A. In the second separator step the pressure was reduced to about 80 bars, the temperature was maintained at 40° C. and the condensed char fraction was collected as fraction B. In the third separator step the pressure was reduced to about 55 bars, the temperature was reduced to about 35° C. and the condensed char fraction was collected as fraction C. The $CO_2$ was returned to the compressor for reuse in the extraction procedure.

Standard curves for the 25 main components were prepared as described in the following:

3 solutions using 6 standard components in each was prepared. 0.1 g of each standard component as shown in table 4 were in 3 groups of 6 components dissolved in 10 ml methylene chloride, and further dissolved to concentrations of, respectively, 2000, 1000, 5000, 200, 100 and 50 ppm standard component using methylene chloride. To each solution 400 ppm of the internal standard solution was added. The 18 solutions were injected to the gas chromatograph. From the result 18 standard curves were prepared.

TABLE 4

| Group | Components | Formula | Mol. | Calculated by: |
|---|---|---|---|---|
| 1 | Furfural | $C_5H_4O_2$ | 96,09 | Standard curve |
| 1 | Phenol | $C_6H_6O$ | 94,11 | Standard curve |
| 1 | 5-Methylfurfural | $C_6H_6O_2$ | 110,11 | Standard curve |
| 1 | 2-Hydroxy-3-methyl-2-cyclopenten-1-on | $C_6H_8O_2$ | 112,13 | Standard curve |
| 1 | o-Cresol | $C_7H_8O$ | 108,14 | Standard curve |
| 1 | p-Cresol | $C_7H_8O$ | 108,14 | Standard curve |
| 2 | Guaiacol | $C_7H_8O_2$ | 124,14 | Standard curve |
| 2 | 2,4-Dimethylphenol | $C_8H_{10}O$ | 122,17 | Standard curve |
| 2 | 2-Methoxy-4-methylphenol | $C_8H_{10}O_2$ | 138,17 | Standard curve |
| 2 | 4-Ethylguaiacol | $C_9H_{12}O_2$ | 152,19 | Standard curve |
| 2 | 3-Methoxycatechol | $C_7H_8O_3$ | 140,14 | Standard curve |
| 2 | Eugenol | $C_{10}H_{12}O_2$ | 164,21 | Standard curve |
| 3 | 2,6-Dimethoxyphenol | $C_8H_{10}O_3$ | 154,17 | Standard curve |
| 4 | Isoeugenol (cis) | $C_{10}H_{12}O_2$ | 164,2 | Calculated from Isoeugenol (trans) |
| 3 | Isoeugenol (trans) | $C_{10}H_{12}O_2$ | 164,2 | Standard curve |
| 4 | methyl-syringol | $C_9H_{12}O_3$ | 168 | Calculated from 4-Ethylguaiacol |
| 4 | ethyl-syringol | $C_{10}H_{12}O_3$ | 182 | Calculated from Isoeugenol (trans) |
| 3 | 4-Hydroxy-3-methoxyphenylacetone | $C_{10}H_{12}O_3$ | 180,2 | Standard curve |
| 4 | propyl-syringol | $C_{11}H_{16}O_3$ | 196,3 | Calculated from 4-Allyl-2,6-dimethoxyphenol |
| 3 | 4-Allyl-2,6-dimethoxyphenol (cis) | $C_{11}H_{14}O_3$ | 194,23 | Standard curve |
| 4 | 4-Allyl-2,6-dimethoxyphenol (trans) | $C_{11}H_{14}O_3$ | 194,23 | Calculated from 4-Allyl-2,6-dimethoxyphenol |
| 4 | 1-propenyl-syringol | $C_{11}H_{14}O_3$ | 194,23 | Calculated from 4-Allyl-2,6-dimethoxyphenol |
| 3 | 3,5-Dimethoxy-4-hydroxybenzaldehyd | $C_9H_{10}O_4$ | 182,18 | Standard curve |
| 3 | 3,5-Dimethoxy-4-hydroxyacetophenone | $C_{10}H_{12}O_4$ | 196,2 | Standard curve |
| 4 | acetonyl-syringol | $C_{11}H_{14}O_4$ | 210 | Calculated from 4-Allyl-2,6-dimethoxyphenol |

The total amount of extracted char was about 25% by weight of the initial char.

The test was repeated with the difference from above that $CO_2$ was introduced until a pressure of about 250 bars was reached. 3 char fractions D, E and F were collected at the reduced pressure steps.

EXAMPLE 4

The char fractions A–F obtained in example 3 were tested for their content of the 25 main components. The test was carried out using gas chromatography and mass spectrophotometry. The following equipment was used for quantification:

Gas chromatograph: HP5890 with a flame ionisation detector FID. Detection temperature about 300° C.

Injector: HP 7673 with split-injection. Injection at a temperature about 275° C., a column flow about 1.83 ml/min, and a total flow about 10 ml/min.

Column SGE BPX35, 30 m, i.d. 0.25 mm, film 0.25 µm. The pressure in the column was about 145 kPa. Data was collected with HP3365 software.

4-methoxyphenol with a retention time of 20.6 minutes and 4-(methylthio)-acetophenon with a retention time of 42.2 minutes were selected as internal standards. These two components are not present in the char or char fractions. The internal standards were used in 10.000 ppm methylene chloride solutions.

From Table 4 it can be seen which of the 18 components were grouped together. For 7 of the main components it was not possible to obtain a standard component, and a standard curve for each of these components was instead calculated from the result obtained by another similar component as indicated in table 4 as well.

The char phase was heated to about 60° C., and 100 µl of the char was diluted with 4 ml methylene chloride, and further 200 µl 4-methoxyphenol internal standard, and 200 µl 4-(methylthio)-acetophenon internal standard were added. A part of the mixture was injected to the gas chromatograph. All tests were carried out twice and the results listed in tables 5a and 5b include the mean value of the two tests, and the standard deviation. The results were calculated using the standard curves and according to normal procedures.

EXAMPLE 5

The fractions A, B and C were tested for their contents of benzo(a)pyrene, benzo(a)anthracene. The analysis was performed by Miljø & Energi Ministeriet, Denmark. The analysis included analysis by capillary GC with MS-detection.

The results are listed in table 6.

TABLE 5a

| | Extracted at 150 bars | | | | | |
| --- | --- | --- | --- | --- | --- | --- |
| | Collected at 100 bars | | Collected at 80 bars | | Collected at 55 bars | |
| Component | 1-1 | 1-2 | 2-1 | 2-2 | 3-1 | 3-2 |
| Furfural | 5064,725 | 5332,939 | 9853,135 | 10547,55 | 15755,98 | 14587,37 |
| Phenol | 3692,606 | 3589,859 | 3540,982 | 3679,939 | 2451,952 | 2219,822 |
| 5-Methylfurfural | 4703,509 | 4587,008 | 4283,636 | 4814,496 | 9596,216 | 7914,851 |
| 2-Hydroxy-3-methyl-2-cyclopenten-1-on | 8604,884 | 8919,178 | 9990,739 | 10185,86 | 10529,53 | 11058,88 |
| o-Cresol | 2621,985 | 2433,419 | 2555,935 | 2680,752 | 3112,942 | 2797,143 |
| p-Cresol | 4551,975 | 4516,708 | 3581,259 | 3881,536 | 3663,964 | 3936,19 |
| Guaiacol | 18106,33 | 18187,18 | 27186,9 | 28361,14 | 36574,99 | 34488,02 |
| 2,4-Dimethylphenol | 3178,63 | 3459,041 | 3209,358 | 3309,988 | 3542,639 | 3300,467 |
| 2-Methoxy-4-methylphenol | 18101,99 | 18298,34 | 25037,53 | 25921 | 30983,67 | 30056,89 |
| 4-Ethylguaiacol | 10396,68 | 10763,08 | 13896,78 | 14308,66 | 16244,84 | 15762,1 |
| 3-Methoxycatecol | 5929,38 | 6388,643 | 5572,753 | 5903,56 | 5272,361 | 5479,169 |
| Eugenol | 11218,2 | 12443,72 | 13581,07 | 14384,3 | 15505,98 | 14362,18 |
| 2,6-Dimethoxyphenol | 38418,44 | 41272,75 | 34945,17 | 36126,62 | 32139,19 | 32331,2 |
| Isoeugenol (cis) | 5251,98 | 5857,788 | 5421,868 | 5401,832 | 4950,826 | 5031,722 |
| Isoeugenol (trans) | 28226,4 | 29818,11 | 26676,51 | 27138,24 | 24260,13 | 23851,68 |
| Methyl-syringol | 27939,22 | 29540,81 | 23285,12 | 23896,24 | 20847,88 | 20369,79 |
| Ethyl-syringol | 20698,19 | 21801,93 | 16285,08 | 16649,48 | 13922,57 | 13887,62 |
| 4-Hydroxy-3-methoxyphenylacetone | 3203,075 | 3458,657 | 2430,708 | 2419,994 | 1301,92 | 1969,809 |
| Propyl-syringol | 5709,5 | 6191,788 | 4683,097 | 4754,931 | 3912,721 | 3995,461 |
| 4-Allyl-2,6-dimethoxyphenol (cis) | 13754,73 | 15123,16 | 10783,49 | 11001,72 | 8883,903 | 8993,422 |
| 4-Allyl-2,6-dimethoxyphenol (trans) | 7571,353 | 8141,668 | 5634,264 | 5720,959 | 4349,983 | 4402,617 |
| 1-Propenyl-syringol | 32366,64 | 33680,48 | 20867,69 | 22117,67 | 13063,73 | 13420,3 |
| 3,5-Dimethoxy-4-hydroxybenzaldehyd | 2207,802 | 2340,746 | 1604,02 | 1728,479 | 1756,33 | 1819,603 |
| 3,5-Dimethoxy-4-hydroxyacetophenone | 1490,931 | 1690,352 | 761,3799 | 760,3565 | 774,2141 | 1037,1 |
| Acetonyl-syringol | 2473,318 | 2772,842 | 1781,826 | 1817,821 | 1539,911 | 1555,571 |

TABLE 5b

| | Extracted at 250 bars | | | | | |
| --- | --- | --- | --- | --- | --- | --- |
| | Collected at 100 bars | | Collected at 80 bars | | Collected at 55 bars | |
| Component | 4-1 | 4-2 | 5-1 | 5-2 | 6-1 | 6-2 |
| Furfural | 1436,564 | 1354,473 | 4992,326 | 4787,041 | 10281,24 | 11395,62 |
| Phenol | 3836,416 | 3633,056 | 4177,719 | 3961,275 | 3879,541 | 3976,687 |
| 5-Methylfurfural | 2574,149 | 2507,245 | 4657,241 | 4496,471 | 6097,432 | 7107,604 |
| 2-Hydroxy-3-methyl-2-cyclopenten-1-on | 6645,415 | 6812,71 | 9242,323 | 9251,154 | 9891,75 | 10585,1 |
| o-Cresol | 1793,237 | 1686,593 | 2576,408 | 2243,279 | 2268,722 | 2354,175 |
| p-Cresol | 4996,866 | 4818,043 | 5014,248 | 5005,04 | 4291,605 | 4199,54 |
| Guaiacol | 7161,679 | 6985,496 | 15777,76 | 15071,77 | 24081,96 | 24644,4 |
| 2,4-Dimethylphenol | 2239,824 | 2084,833 | 2935,251 | 2641,176 | 2832,061 | 2791,286 |
| 2-Methoxy-4-methylphenol | 6699,282 | 6472,283 | 14275,18 | 13530,04 | 19880,89 | 20171,15 |
| 4-Ethylguaiacol | 3620,132 | 3478,718 | 7647,546 | 7323,699 | 10144,34 | 10202,32 |
| 3-Methoxycatecol | 7503,36 | 8263,731 | 7968,391 | 8210,96 | 6444,219 | 6540,001 |
| Eugenol | 4933,237 | 4600,067 | 8838,103 | 8534,011 | 9350,729 | 9527,083 |
| 2,6-Dimethoxyphenol | 39522,77 | 40059,24 | 44400,08 | 42766,02 | 35609,35 | 36088,18 |
| Isoeugenol (cis) | 2233,856 | 2455,952 | 3603,779 | 3629,262 | 3733,841 | 3942,034 |
| Isoeugenol (trans) | 16544,45 | 16996,74 | 22227,41 | 21316,89 | 19201,47 | 19474,73 |
| Methyl-syringol | 26717,83 | 27035,04 | 29334,26 | 28152,58 | 22405,32 | 22690,23 |
| Ethyl-syringol | 17614,73 | 17688,02 | 18959,66 | 18083,54 | 14288,44 | 14434,89 |
| 4-Hydroxy-3-methoxy phenylacetone | 3655,06 | 4009,842 | 3922,037 | 3925 | 2691,105 | 2726,694 |
| Propyl-syringol | 4910,117 | 5137,715 | 5153,132 | 4969,227 | 3948,904 | 3947,485 |
| 4-Allyl-2,6-dimethoxyphenol (cis) | 13616,04 | 14406,54 | 13430,44 | 12886,61 | 9668,593 | 9689,181 |
| 4-Allyl-2,6-dimethoxyphenol (trans) | 7445,445 | 7723,726 | 7768,294 | 7612,838 | 5403,303 | 5422,826 |
| 1-Propenyl-syringol | 19591,62 | 19829,32 | 29846,76 | 28843,59 | 20290,67 | 20299,5 |
| 3,5-Dimethoxy-4-hydroxybenzaldehyd | 9777,178 | 9993,301 | 5208,589 | 5116,882 | 2205,879 | 2198,552 |
| 3,5-Dimethoxy-4-hydroxyacetophenone | 4114,359 | 4417,422 | 3013,018 | 2901,386 | 1394,679 | 1395,517 |
| Acetonyl-syringol | 4690,574 | 4946,64 | 4157,284 | 4148,836 | 2395,18 | 2344,409 |

TABLE 6

| Component group | Component | Content in char fraction A | Content in char fraction B | Content in char fraction C |
| --- | --- | --- | --- | --- |
| Polyaromatic hydrocarbons | Benzo(a)pyrene | 31 µg/kg | 3.0 µg/kg | 14 µg/kg |
| | Benzo(a)anthracene | 11 µg/kg | 1.4 µg/kg | 17 µg/kg |

The fraction A was further tested for its content of heavy metals. The result is found in table 7.

TABLE 7

| Arsenic | 1.7 mg/kg |
| --- | --- |
| Mercury | 0.01 mg/kg |
| Cadmium | <0.03 mg/kg |
| Lead | <0.2 mg/kg |

EXAMPLE 6

Two fresh salmon sides of approximately 400 g each were treated with a smoke extract composed of the char fraction B of example 3 mixed with rape oil.

The first salmon side (sample 1) was treated with about 2 ml of a 3% char fraction B by weight in rape oil smoke extract. The smoke extract was injected into the salmon meat using a conventional injection syringe. The extract was injected in 20 portions from one of the major surfaces of the sample evenly spread over the surface.

The second salmon side (sample 2) was treated with about 2 ml of a 6% char fraction B by weight in rape oil smoke extract. The smoke extract was injected into the salmon meat using a conventional injection syringe. The extract was injected in 10 portions from one of the major surfaces of the sample evenly spread over the surface.

After the treatment with smoke extract the samples were immediately transferred to a microwave oven where each of the samples were treated for approximately 60 seconds at 90 watt.

The treated salmon sides were together with a traditionally smoked salmon side served for a taste panel of 10 persons. All of the persons in the test panel found the taste and the texture of the salmon sides sample 1 and 2 as good as the taste of the traditionally smoked salmon side. The majority of the test panel found that the salmon sides sample 1 and 2 were more juicy than the traditionally smoked salmon side. All persons of the test panel found that the smoke taste of sample 2 was heavier than the smoke taste of sample 1, however both samples had smoke taste within the acceptable level. All persons of the test panel found that the smoke tastes of both samples were evenly distributed.

EXAMPLE 7

A fresh salmon side (sample 3) of approximately 400 g was prepared as sample 2 in example 6, with the difference that the salmon side after treatment with smoke extract and prior to the microwave treatment was vacuum packed in a PE film.

Immediately after the microwave treatment the PE film was removed from the salmon side, and the taste and texture of the salmon side sample 3 was compared with the taste and texture of sample 2 from example 6. No differences could be detected.

The invention claimed is:

1. A method of preparing a smoke extract comprising the steps of:
   i) preparing a char from wood or cellulose by pyrolysis;
   ii) placing a portion of the char in a reaction container;
   iii) obtaining an extraction solvent in its supercritical state, said solvent in its supercritical state being selected from the group consisting of $CO_2$, propane, methane, ethylene, ammonia, methanol, and mixtures of one or more of these solvents;
   iv) maintaining the extraction solvent in its supercritical state at a temperature between 20° C. and 100° C. and at a pressure between 75 and 500 bars.
   v) bringing the extraction solvent in its supercritical state into intimate contact with the char for a sufficient time to extract a measurable amount of the char and to reduce the amount of benzo(a)pyrene and benzo(anthracene so that the char is safe for use as a food flavoring;
   vi) removing the solvent from the extracted char from step v);
   vii) reducing the pressure, in one or more steps, to condense at least a portion of the extracted char in each step of pressure reduction; and
   viii) collecting the extracted condensed char.

2. A method of preparing a smoke extract according to claim 1, wherein the char is being prepared by decomposing wood or cellulose by pyrolysis to obtain an ash, a gas phase and char.

3. A method of preparing a smoke extract according to claim 1, wherein the char, prior to the extraction step, is mixed with a carrier which is substantially non-soluble in the extraction solvent in its supercritical state to obtain an immobilized char.

4. A method of preparing a smoke extract according to claim 3, wherein the carrier is selected from the group consisting of diatomite, celite, bentonite, perlite and mixtures thereof.

5. A method of preparing a smoke extract according to claim 3, wherein the ratio of char to carrier is between 1:0.1 to 1:10.

6. A method of preparing a smoke extract according to claim 3, wherein the ratio of char to carrier is between 1:0.5 and 1:2.

7. A method of preparing a smoke extract according to claim 1, wherein the char is diluted by adding a liquid solvent and inorganic acid components prior to the extraction step.

8. A method of preparing a smoke extract according to claim 7, wherein the liquid solvent is selected from the group consisting of vegetable oils, animal oils, ethanol, water or mixtures thereof.

9. A method of preparing a smoke extract according to claim 7, wherein the liquid solvent is an enhancer for the extraction of fractions from the char, said enhancer being selected from the group consisting of methanol, ethanol, water or mixtures thereof.

10. A method of preparing a smoke extract according to claim 7, wherein the amount of liquid solvent added to the char is up to about 100% by weight of the char, and the char is dissolved to achieve an average char concentration of at least 10% by weight.

11. A method of preparing a smoke extract according to claim 7, wherein the amount of liquid solvent added to the char is up to about 100% by weight of the char, and the char is dissolved to achieve an average char concentration of between 10 and 95% by weight.

12. A method of preparing a smoke extract according to claim 1, wherein the extraction step comprises batch wise extraction of the char.

13. A method of preparing a smoke extract according to claim 12, wherein the extraction solvent in its supercritical state is contacted with the char for at least 5 minutes.

14. A method of preparing a smoke extract according to claim 12, wherein said reaction container comprises at least two openings covered with a filter having a filter mesh sufficiently small so as not to allow the non-extracted char to escape from the reaction container and sufficiently large so as to allow the extraction solvent to flow through the filters under the extraction conditions.

15. A method of preparing a smoke extract according to claim 14, wherein the flow of the extraction solvent through the reaction container is at least 0.5 kg extraction solvent per liter of the reactor per hour.

16. A method of preparing a smoke extract according to claim 14, wherein the flow of the extraction solvent through the reactor is between 1 and 10 kg extraction solvent per liter of the reactor per hour.

17. A method of preparing a smoke extract according to claim 12, wherein the batch wise extraction includes the steps of: steps v) vi) and vii) one or more times, and wherein the collected extracted char from step viii) is pooled.

18. A method of preparing a smoke extract according to claim 1, wherein the extraction step is carried out as a continuous extraction of the char in a column reactor, and wherein said column reactor comprises at least two extraction solvent openings preferably covered with a filter having a filter mesh sufficiently small so as not to allow the non-extracted char to escape from the reactor and sufficiently large so as to allow the extraction solvent to flow through the filters under the extraction conditions, and an entrance and an outlet for char.

19. A method of preparing a smoke extract according to claim 15, wherein said method comprises a continuous introduction of char and extraction solvent into the column reactor to perform a counter current extraction, allowing the extraction solvent with extracted char to flow out of the column reactor to obtain or maintain a predetermined pressure, and removing any unextracted char from the column reactor continuously or step wise.

20. A method of preparing a smoke extract according to claim 1, wherein the extraction solvent comprises at least 90% by weight of $CO_2$.

21. A method of preparing a smoke extract according to claim 1, wherein the temperature of the extraction solvent is regulated during the extraction step.

22. A method of preparing a smoke extract according to claim 1, wherein the temperature, the pressure and the contact time in steps iv and v) are chosen so that at least 1% by weight of the char is dissolved in the solvent in its supercritical state.

23. A method of preparing a smoke extract according to claim 1, wherein the pressure is reduced in two, three or four steps.

24. A method of preparing a smoke extract according to claim 23, wherein the extraction solvent comprises at least 90% by weight of $CO_2$, and the pressure is reduced in three steps.

25. A method of preparing a smoke extract according to claim 24, wherein the pressure in the first step of reduction is reduced to 95–105 bars, the pressure in the second step of reduction is reduced to 75–85 bars, and the pressure in the third step of reduction is reduced to about 55 bars or below.

26. A method of preparing a smoke extract according to claim 23, wherein the extraction solvent comprises at least 95% by weight of $CO_2$, and the pressure is reduced in three steps.

27. A method of preparing a smoke extract according to claim 1, wherein the extracted char is mixed with a liquid to obtain a liquid smoke extract.

28. A method according to claim 27, wherein the liquid is an oil or a mixture of oils, selected from the group consisting of vegetable oils and animal oils.

29. A method of preparing a smoke extract according to claim 27, wherein the char is mixed with up to about 20 parts by weight of liquid per part by weight of extracted char.

30. A method of preparing a smoke extract according to claim 27, wherein the char is mixed with between about 3 and 10 parts by weight of the liquid per part by weight of extracted char.

31. A method of preparing a smoke extract according to claim 1, wherein the char is diluted by adding a liquid solvent and basic components prior to the extraction step.

32. A method of preparing a smoke extract according to claim 1, wherein the extraction solvent in its supercritical state is contacted with the char for at least at least 15 minutes.

33. A method of preparing a smoke extract according to claim 1, wherein the extraction solvent in its supercritical state is contacted with the char for between 20 and 60 minutes.

34. A method of preparing a smoke extract according to claim 1, wherein the extraction solvent comprises at least 95% by weight of $CO_2$.

35. A method of preparing a smoke extract according to claim 1, wherein the char is contacted with the solvent in its supercritical state at a temperature between 40° C. and 60° C.

36. A method of preparing a smoke extract according to claim 1, wherein the char is contacted with the solvent in its supercritical state at a pressure between 100 and 250 bars.

37. A method of preparing a smoke extract according to claim 1, wherein the char is contacted with the solvent in its supercritical state at a pressure of about 150 bars.

38. A method of preparing a smoke extract according to claim 1, wherein the temperature, the pressure and the contact time steps iv and v) are chosen so that between 5 and 60% by weight of the char is dissolved in the solvent in its supercritical state.

39. A method of preparing a smoke extract according to claim 1, wherein the temperature, the pressure and the contact time steps iv and v) are chosen so that between about 5 and 20% by weight of the char is dissolved in the solvent in its supercritical state.

* * * * *